United States Patent [19]
Kozulla et al.

[11] 3,789,881
[45] Feb. 5, 1974

[54] REFRIGERATION SERVICE VALVE

[75] Inventors: Robert E. Kozulla, Willowick; Richard J. Silagy, Parma, both of Ohio

[73] Assignee: The Weatherhead Company, Cleveland, Ohio

[22] Filed: Mar. 31, 1972

[21] Appl. No.: 240,096

[52] U.S. Cl............................ 137/625.48, 251/334
[51] Int. Cl............................................ F16k 11/02
[58] Field of Search......... 137/625.5, 625.4, 625.48, 137/625.49; 251/334, 333

[56] References Cited
UNITED STATES PATENTS

| | | | |
|---|---|---|---|
| 3,257,095 | 6/1966 | Siver | 251/334 X |
| 3,669,407 | 6/1972 | Mundt et al. | 251/334 |
| 3,587,156 | 6/1971 | Sorenson | 137/625.48 X |
| 1,800,127 | 4/1931 | Wilson | 251/334 |
| 3,185,438 | 5/1965 | Smirra | 251/334 |
| 3,426,741 | 2/1969 | Haagen | 251/334 X |
| 3,583,441 | 6/1971 | Grant et al. | 137/625.48 |
| 3,680,593 | 8/1972 | Sorenson | 137/625.48 |

*Primary Examiner*—Samuel Scott
*Attorney, Agent, or Firm*—McNenny, Farrington, Pearne & Gordon

[57] ABSTRACT

A valve assembly and method of making the same particularly suited for use as a double seat refrigeration valve comprising a body which has an internal poppet receiving chamber and a pair of valve seats at opposite ends of the chamber with one seat associated with an axial port and the other seat associated with an axial stem guide bore. The poppet has an initial outer diameter at least as small as the axial port seat to permit it to be positioned in the chamber through the axial port and is adapted to be plastically expanded radially outwardly by a flaring tool to a final diameter larger than the axial port seat so it is capable of sealing the port to prevent fluid communication between the axial port and a second port in the chamber. The poppet includes a sealing surface adapted to seal the stem guide bore seat when the poppet is moved away from the axial port seat.

8 Claims, 8 Drawing Figures

PATENTED FEB 5 1974 3,789,881
SHEET 1 OF 2

REFRIGERATION SERVICE VALVE

BACKGROUND OF THE INVENTION

The invention relates to valve assemblies and in particular to improvements in valve bodies and poppets and methods of their manufacture and assembly.

The invention is ideally suited for use in a type of double seat refrigeration valve such as shown in U. S. Pat. Nos. 2,536,727 and 3,587,157. Typically, a valve assembly of this type comprises a body having at least two parts adapted to communicate with each other through an internal chamber and a valve seat. A valve stem and poppet are moved against the seat to seal it and prevent communication between the two ports. Preferably, a second valve seat is provided in the body, opposite to the first seat, to seal against fluid passing from the chamber through a third port and/or a bore in which the valve stem is guided. The valve poppet or head includes double sealing faces so that when the stem is retracted away from the first seat a second face of the valve poppet seals the second body seat.

In order to seal the body seats, the head or poppet, of course, must be larger than the seats. Since the head, by design, cannot normally pass through either of the oppositely facing body seats, it has been customary in the prior art to provide the valve body as an assembly of at least two separate parts. The two parts, each forming one of the body seats, are normally assembled together around the poppet. Generally associated with the manufacture and assembly of these separate body parts are machining operations for forming mating surfaces, handling and fitting or separate pieces and operations for permanently joining the parts together. While individual costs for each article associated with these steps are relatively small, such costs are additive to a point where they become economically significant.

In the past, valve body parts have typically been machined with telescoping or mating cylindrical portions, positioned one in another, and subsequently fused together as in a furnace brazing operation. Besides the additional cost of heat processing the parts, such joining methods have given rise to complications and restrictions in the manufacture of the parts. For example, these difficulties have required provisions for preventing joining material from spreading to surface areas which must remain uncoated such as the surfaces of close fitting threads and bores. Further, heat processing of the parts affects the final mechanical properties of their materials. This has resulted in undesirable limitations and compromises in the selection and treatment of materials.

SUMMARY OF THE INVENTION

The invention provides a valve assembly and method by which it may be made wherein the valve body is formed of a unitary blank or is permanently assembled from separate parts before a poppet and valve stem is positioned therein. The poppet or head portion of the valve stem is initially formed with a diameter small enough to pass into an internal body chamber through a valve seat in the body. After the poppet is positioned in the internal valve chamber, it is plastically deformed or expanded radially outwardly so that its final diameter is sufficiently large to form a seal with the seat through which it entered the chamber.

In the preferred embodiments, a single element or block is machined or otherwise formed with an axial internal poppet receiving chamber and oppositely facing valve seats at the ends of the chamber. A valve stem and integral poppet are inserted forwardly into the chamber through an axial port and an associated valve seat, stem first, until the valve stem extends into an axial threaded guide bore providing in the body. A rearward face of the poppet is arranged with a pilot bore which forms a tubular skirt section and which is adapted to receive a flaring tool. After the poppet is positioned within the chamber, the flaring tool is forcibly driven into the pilot bore to plastically deform the tubular skirt section radially outwardly. The final diameter of the tubular skirt section is greater than the body valve seat through which it passed so that it is capable of sealing it. Desirably, an opposite face of the poppet is provided with a sealing surface that is arranged to engage a seat to seal the stem guide bore and, optionally, an associated valve port.

The invention eliminates the previous requirement that the body be made of at least two parts to permit the poppet to be assembled between opposed double seats. In accordance with the invention, former procedures for specially forming, assembling and permanently joining multipart valve bodies are thereby avoided. For example, the complications and restrictions involved with fusing or brazing separate body parts may be avoided. Further, if it is desirable to fabricate the valve body by permanently fusing two or more parts together, the parts may be fused before the valve stem and poppet are placed so that there is no danger of the valve stem being fused to the body or the mechanical properties of the valve stem and poppet being affected by the heat of the fusing temperatures. Thus, this invention provides a choice to the manufacturer of a greater range of materials, machining and forming operations as well as better assembly techniques for more economical mass production.

DESCRIPTION OF THE PREFERRED EMBODIMENTS

Figure 1:
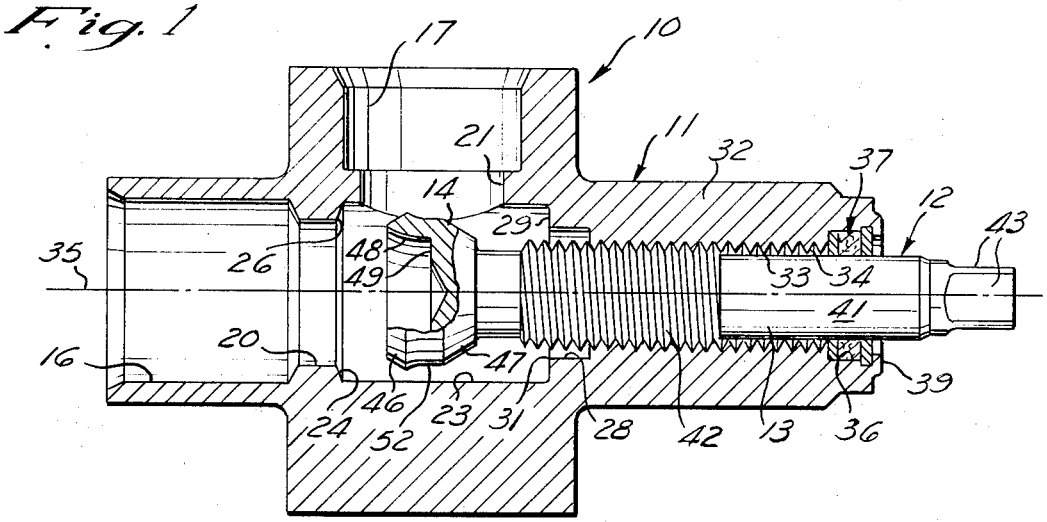
FIG. 1 is a cross sectional view of a valve assembly in accordance with a preferred embodiment of the invention.

Referring now to FIGS. 1 through 4, there is provided a valve assembly 10, in accordance with a preferred embodiment of the invention, including a valve body or block 11 and a valving member 12 having an elongated cylindrical stem portion 13 and an integral head portion or poppet 14.

The valve body 11 is preferably formed by machining a one piece blank of brass or steel or other suitable metal. A pair of cylindrical bores 16 and 17 at right angles to one another form first and second valve ports respectively. The ports 16 and 17 are adapted to be connected with tubing or conduit inserted therein and sealed by a soldered or sweated joint in a manner well known in the art. Alternative means for connecting tubing or conduit to the port 16 and 17 such as threaded bores and fittings may be used where desirable or necessary. The ports 16 and 17 each have associated intermediate cylindrical bores 20 and 21 leading to a common fluid tight internal chamber or bore 23 which provides fluid communication between the ports. Preferably, the internal chamber 23 is cylindrical and has a diameter somewhat larger than the intermediate bore 20.

At a leftward end of the chamber 23 there is formed a substantially radial surface 24 extending inwardly from the cylindrical wall of the chamber 23 to the intermediate bore 20 forming an annular surface or valve seat 26 therewith. At a rightward end of the chamber 23 there is provided a short cylindrical bore or recess 28 extending axially from a generally radial end wall 29 of the chamber 23. The junction of the cylindrical bore 28 and end wall 29 forms an annular surface or valve seat 31 opposed to the other valve seat 26.

An axial extension 32 of the body 11 includes a stem guide bore 33 having internal threads 34 and defining a valve axis 35. At the end of the extension 32 there is provided a counterbore 36 in which a valve stem seal assembly, designated generally at 37, of well known construction is received. A circular lip 39 of body material is roll formed or otherwise shaped to capture the seal 37 in the counterbore 36.

The stem portion 13 of the valving member 12 includes a cylindrical section 41 which normally extends through and is sealed by the assembly 37. Additionally, the stem portion 13 includes a threaded section 42 complimentary to the internal threads 34 of the guide bore 33. At a rightward or outer end of the stem portion 13 there are provided wrenching flats or surfaces 43 adapted to be engaged by a suitable tool for turning the valve member 12 in the threaded guide bore 33 to thereby cause it to move along the valve axis 35.

The head portion 14 of the valve member 12, preferably, is integral with the stem portion 13. The head portion or poppet 14 includes a pair of oppositely facing external conical sealing surfaces 46 and 47 concentric with an axis of the stem. A circular bore or recess 48 provided in the outer or leftward end of the head portion 14 terminates at a radial surface 49 axially spaced slightly from the conical surface 47.

Figure 2:
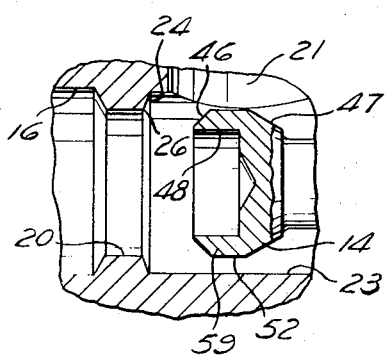
FIG. 2 is a fragmentary view of a valve body illustrated a poppet or valve stem head in its initial condition prior to a flaring operation.

As illustrated in FIG. 2, the poppet 14 is initially formed with a cylindrical outer surface 52 having a diameter at least as small as the diameter of the intermediate bore 20 which forms the edge or valve seat 26 so that the valve member 12 may be assembled in the one piece valve body 11 by inserting it, stem portion first, through the leftward port 16. The various bores 16, 20, 23 and 28 are concentric with the axis 35 defined by the threaded bore 33 so that the valve stem portion 13 passes through these bores into the threaded guide bore.

The recess 48 in the valve head portion or poppet 14, initially, may be cylindrical or may have a slight taper to permit it to be engaged by a tool (not shown) adapted to support the valve member 12 in the body 11 until the stem portion 13 thereof is positioned in the guide bore 33. The tool may thereafter be used to rotate the valve member 12 to engage the threaded section 42 with the threaded bore 33 to a point where the poppet 14 is entirely within the inner chamber 23.

Figure 3:
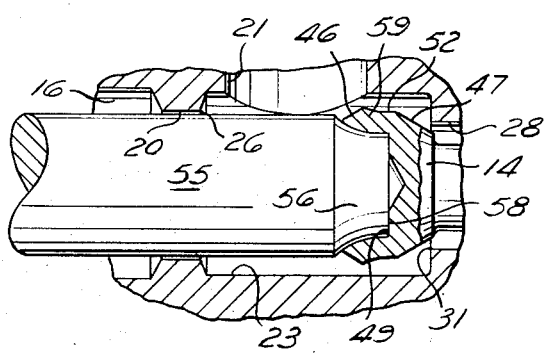
FIG. 3 is a fragmentary view of the valve body and poppet with a flaring tool in full engagement with the poppet.

In accordance with the invention, the poppet 14 is finally finished or shaped after it is received in the internal valve chamber 23. The final forming of the poppet 14 is accomplished with a flaring tool 55. As illustrated in FIG. 3, the tool 55 has a major diameter slightly smaller than the intermediate bore 20 to permit it to enter the internal chamber 23 through the axial port 16. The tool 55 includes a conical or tapered end 56 including a radial end face 58 having a minor diameter at least as small as the initial diameter of the poppet bore 48 to permit it to readily enter the bore upon initial engagement therewith. The tool 55 is driven against the poppet 14 with sufficient force to flare a tubular lip or skirt 59, defined at its exterior by the outer surface 52 and its interior by the bore 48, radially outwardly until the end face 58 of the tool engages the inner radial face 49 of the poppet 14. The material forming the tubular skirt 59 is plastically or permanently deformed by the tool end 56 such that the mean diameter of the sealing surface 46 is increased from its original form illustrated in FIG. 2.

Figure 4:
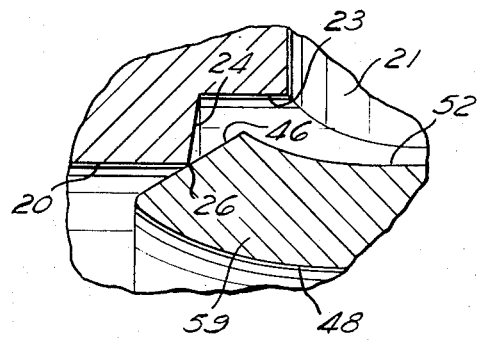
FIG. 4 is an enlarged fragmentary view of a seat portion of the valve body, illustrated in the previous Figures, sealingly engaged by a radially outwardly flared skirt portion of the poppet.

In its flared condition, the sealing surface 46, as best illustrated in FIG. 4, is adapted to sealingly engage the valve seat 26 when the valve member 12 is turned in the body 11 and is thereby caused by the threads 34 to move axially into engagement with the seat 26. Sealing engagement between the poppet 14 and valve seat 26 prevents fluid communication between the first and second ports 16 and 17.

As illustrated in FIG. 2, the opposite sealing surface 47 of the poppet 14 has a major diameter greater than its associated valve seat 31 in its initial form. Accordingly, it is not necessary that the tool 55 radially expand this sealing surface 47. The valve member 12 is turned in the opposite direction from that required for sealing the seat 26 to cause the poppet sealing surface 47 to engage the seat 31. In this instance, a positive mechanical seal insures against loss of fluid such as refrigerant gas from the chamber 23 along the stem bore 33.

Figure 5:
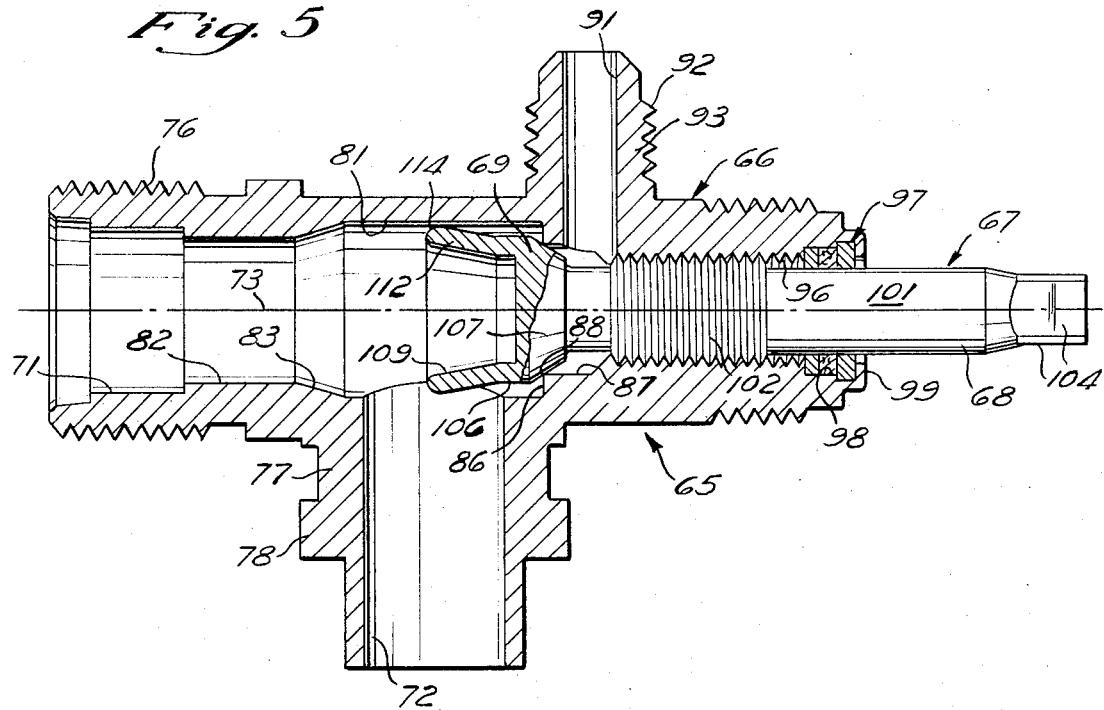
FIG. 5 is a cross sectional view of a valve assembly in accordance with a second embodiment of the invention.

A second embodiment of the invention is illustrated in FIGS. 5 through 8. Referring in particular to FIG. 5, there is illustrated a valve assembly 65 including a valve body 66 and a valving member 67 having an elongated cylindrical stem portion 68 and a head portion or poppet 69.

The valve body 66, as in the first embodiment, is preferably formed by machining a unitary block of suitable metal and includes a pair of perpendicular cylindrical bores or primary ports 71 and 72. A first port 71 is concentric with an axis 73 of the valve assembly 65. This axial port 71 is adapted to be connected with a tube fitting by threading a nut of the fitting on external threads 76 in a conventional manner. A nut (not shown) may be captured on a cylindrical projection 77, associated with the other primary port 72, inwardly of a circular shoulder 78 such that the nut may engage external threads of a tube fitting for coupling of the fitting to this second port.

The ports 71 and 72 are adapted to communicate with each other through an internal fluid tight body chamber 81. While the second port 72 leads directly to the chamber 82, the first port 71 is connected to the chamber by an intermediate bore 82 and a conical internal surface or valve seat 83, both concentric with the axis 73. The valve seat 83 increases in diameter in a direction towards the valving member 67. As illustrated, the internal chamber 81 is preferably formed as an enlarged cylindrical axial bore having a diameter equal to the major diameter of the valve seat 83.

At an end of the chamber 81 opposite the conical valve seat 83 there is provided a generally radial surface 86 and a short cylindrical axial bore 87. An edge or junction between the radial surface 86 and the axial bore 87 forms a second axial valve seat 88 opposed to the conical valve seat 83. In communication with the internal chamber 81 through the bore 87 is an auxiliary or third port 91. The third port 91 is adapted to be connected with a tube or conduit by threading a fitting of the tube or conduit into engagement with external threads 92 formed on a valve body projection 93 in which the third port 91 is formed.

Adjacent the axial bore 87 is a threaded axial guide bore 96 adapted to support the valving member 67 therein. At the rightward end of the valve body 66 is a stem seal assembly, designated generally at 97, retained in an axial counterbore 98 by a circular lip 99 bent over the assembly. The stem portion 68 of the valving member 67 includes a cylindrical segment 101, sealed by the seal assembly 97, and a threaded segment 102 compatible with the threads of the bore 96. The valving member 67 may be rotated in the valve body 66 by engaging wrenching flats 104 on the outer end of the member with a suitable tool to cause the member to move axially in the valve body.

Figure 6:
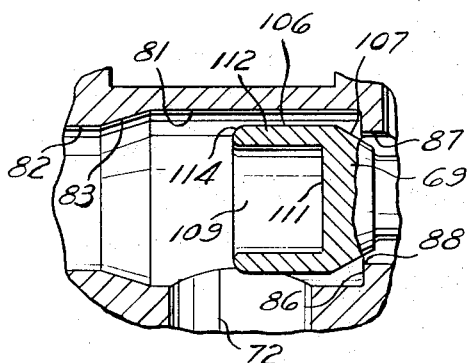
FIG. 6 is a fragmentary view of the valve body illustrating the poppet in its initial unflared configuration.

Referring to FIG. 6, the valve poppet or head portion 69 is initially formed with a cylindrical outer surface 106 defining the major initial diameter of the poppet. At a rightward or inner end of the cylindrical outer surface 106 there is formed a conical sealing surface 107 adapted to engage the adjacent valve seat 88. In its initial form, a face of the poppet 69 opposite the conical sealing surface 107 includes a cylindrical bore 109 terminating at a radial end face 111 axially displaced slightly from the conical surface 107. The bore 109 and cylindrical outer surface 106 define an axially extending tubular lip or skirt section 112 which terminates at its outer end with a rounded or inwardly beveled edge 114.

As in the embodiment illustrated in FIGS. 1 through 4, the major diameter of the poppet 69 defined by the initially cylindrical surface 106 is at least as small as the opening through the valve seat 83 opposite the valve stem guide bore 96 in order that the valving member 67 may be assembled in the valve body 66 through the first port 71 and the intermediate bore 82.

Figure 7:
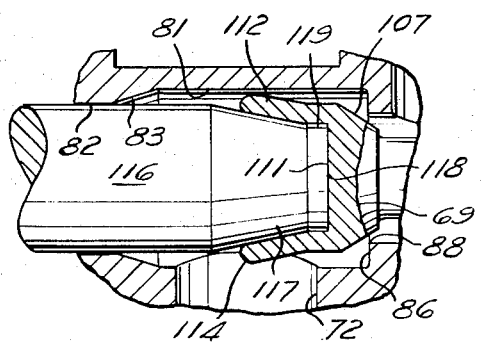
FIG. 7 is a fragmentary view of the valve body, similar to FIG. 6, showing a flaring tool in full engagement with the poppet.
Figure 8:
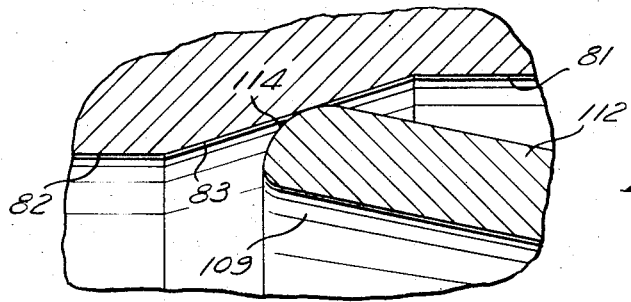
FIG. 8 is a fragmentary view, on an enlarged scale, of a seat portion of the embodiment illustrated in FIGS. 5 through 7 with a flared skirt portion of the poppet in sealing engagement therewith.

Referring now to FIGS. 7 and 8, once the poppet 69 is received within the inner chamber 81 a tool 116 having a conical or tapered end 117 including a radial end surface 118 is forcibly driven into the bore 109 of the poppet 69. Ideally, a leading portion 119 of the tool 116 has a diameter slightly less than or equal to the initial diameter of the bore 109 so that the tool is radially supported or piloted into the bore. Preferably, the tool 116 is forced into the poppet bore 109 until its lead end face 118 abuts the radial end face 111 of the poppet. In this manner, the tubular skirt 112 is plastically deformed radially outwardly until its final configuration has a major diameter substantially larger than the minor diameter, defined by the intermediate bore 82, of the conical seat 83.

Thereafter, communication between the first and second ports 71 and 72 may be interrupted by turning the valving member 67 in the valve body 66 until the curved edge 114 of the radially expanded skirt 112 sealingly engages the conical seat 83 as shown in FIG. 8. Likewise, as illustrated in FIG. 5, communication between the third or auxiliary port 91 and the inner chamber 81 is prevented by backing out the valving member 67 until the conical sealing surface 107 of the poppet 69 engages its associated seat 88.

In both illustrated preferred embodiments, the segment of the poppet which is plastically deformed is provided as a tubular lip of skirt. The tubular configuration permits the associated sealing surfaces of the poppet to resiliently deflect slightly when contacting the corresponding valve seat to accommodate limited dimensional variations and eccentricities of the parts. In particular, the lip portion itself, which is deformed or flared without the benefit of the full support which a female die would provide if the poppet head could be finally finished before being positioned in the valve body, may tend to vary slightly from its ideal form.

It may be appreciated that the body projections forming the ports 71, 72 and 91, for example, need not be formed from the same integral block forming the major axial portion of the respective valve body but rather may be furnace brazed onto the axial portion in a manner such as detailed in the previously cited U. S. Pat. No. 2,536,727. Further, certain principles of the invention may be applied where the valve body portions providing the opposed or double seats are originally formed of separate pieces but are permanently assembled, such as by furnace brazing before the stem and poppet are assembled therein. In this case, the stem and poppet need not be subjected to furnace temperatures and a resulting change in their hardness.

It is further within the contemplation of the invention that the poppet may be formed of a separate piece from the stem and that these members be permanently assembled before or after insertion in the valve body. The invention has utility in valving assemblies which do not require double valve seats but where it is desirable that the valve stem is permanently assembled in the valve body to prevent its accidental removal. This result, of course, is achieved when the stem head or poppet is fixed to the stem and is larger than the stem guide bore. While, as disclosed, the stem and poppet are inserted through a valve seat opposite the seat associated with the stem bore, it is contemplated that these elements, alternatively, may be assembled through the stem guide bore with the poppet being subsequently plastically deformed or expanded radially outwardly to seal against the seat associated with the guide bore.

While preferred embodiments of the invention have been shown and described in detail, it is understood that the invention can take many other forms and embodiments, and that such forms and embodiments as may occur to those skilled in the art may be resorted to without departing from the scope of the invention as defined in the following claims.

What is claimed is:

1. A valve comprising a body, an elongated valve stem, a first port on the body communicating with an internal circular valve seat formed permanently with the body, an inner fluid tight chamber in the valve body adjacent the body valve seat and having dimensions transverse to a longitudinal stem axis larger than the diameter of the body valve seat, a second port in communication with said chamber, a valve stem head disposed in said chamber on an inner end of the valve stem, means for guiding the valve stem for axial movement in the body including a guide bore in the body at a portion thereof adjacent to said chamber away from said body valve seat, said valve stem head being larger in diameter than said guide bore and including at an end thereof adjacent said body valve seat a sealing lip plastically deformed radially outwardly from adjacent portions of the head; said lip having a diameter larger than the diameter of the said valve seat, said guide means permitting axial movement of said stem in either direction whereby said sealing lip is alternatively adapted to sealingly engage said body valve seat to prevent fluid communication between said first and second ports through said chamber or to be axially displaced from said body valve seat to permit fluid communication between said ports.

2. A valve as set forth in claim 1 wherein said body includes a circular bore portion associated with said first port, a generally radial surface extending radially outwardly from an inner end of said circular bore portion and a junction of said radial surface and said circular bore forms said body valve seat.

3. A valve as set forth in claim 1 wherein said stem head end includes a bore opening towards said body valve seat and defining with radially outer surfaces of the stem head an axially extending tubular radially resilient sealing lip having its major outer diameter adjacent said body valve seat.

4. A valve as set forth in claim 3 wherein said body includes a second valve seat between said body chamber and said guide bore, said stem head being disposed between said body valve seats and including a sealing surface portion thereon adapted to sealingly engage said second body valve seat when said valve stem is displaced from said first body seat, said sealing surface portion being formed on a second of said stem head axially displaced from said tubular lip, said second body valve seat when in sealing engagement with said sealing surface portion preventing fluid communication between said chamber and said guide bore.

5. A valve as set forth in claim 1 wherein said body valve seat is a conical surface having a decreasing diameter with distance from said valve stem.

6. A valve as set forth in claim 5 wherein a major diameter of said conical surface is substantially equal to the diameter of said chamber.

7. A valve as set forth in claim 5 wherein said conical surface is formed of body material which is unitary with the body portion forming said guide bore.

8. A valve assembly comprising a body formed from a single block having arranged on a common axis therein integral first and second opposed valve seats, a poppet receiving chamber between said seats, a port associated with the first valve seat, and a threaded stem guide bore associated with the second seat, said body also including a second port communicating with said chamber, a valving member including a threaded stem portion engaged with the threaded stem guide bore of the body and a poppet portion integral with the stem portion and positioned in said chamber, said poppet portion including a tubular skirt section opening toward said first seat, and a circular sealing surface facing said second seat, said tubular skirt section being plastically deformed radially outwardly from adjacent areas of the poppet portion and having its major outer diameter adjacent said first seat, said tubular skirt section being adapted to sealingly engage said first seat to prevent fluid communication between said ports and, alternatively, said sealing surface being adapted to sealingly engage said second seat to prevent passage of fluid along said guide bore.

* * * * *

UNITED STATES PATENT OFFICE
CERTIFICATE OF CORRECTION

Patent No. __3,789,881__   Dated __February 5, 1974__

Inventor(s) __Robert E. Kozulla and Richard J. Silagy__

It is certified that error appears in the above-identified patent and that said Letters Patent are hereby corrected as shown below:

Column 1, line 12, change "parts" to -- ports -- .

Column 1, line 34, change "or" to -- of -- .

Column 2, line 8, change "providing" to -- provided -- .

Column 2, end of line 46 and beginning of line 47, change "illustrated" to -- illustrating -- .

Column 5, line 10, change "82" to -- 81 -- .

Column 6, line 24, change "of" to -- or -- .

Column 6, line 52, change "valving" to -- valve -- .

Column 7, line 23, after "said" insert -- body" -- .

Column 8, line 7, change "second" to -- section -- .

Signed and sealed this 9th day of July 1974.

(SEAL)
Attest:

McCOY M. GIBSON, JR.
Attesting Officer

C. MARSHALL DANN
Commissioner of Patents